Nov. 5, 1963   A. J. WILSON   3,109,681
BRAKE OPERATING SYSTEMS FOR VEHICLES
Filed April 25, 1961   2 Sheets-Sheet 1

Alexander John Wilson
By:
Scrivener & Parker

United States Patent Office 3,109,681
Patented Nov. 5, 1963

3,109,681
BRAKE OPERATING SYSTEMS FOR VEHICLES
Alexander John Wilson, Sutton Coldfield, England, assignor to Girling Limited, Birmingham, England, a British company
Filed Apr. 25, 1961, Ser. No. 105,393
Claims priority, application Great Britain Apr. 30, 1960
5 Claims. (Cl. 303—22)

This invention relates to improvements in brake operating systems for vehicles.

The braking effort which can be developed at a road wheel of a vehicle before skidding occurs is partly dependent on the wheel loading. In vehicles for carrying passengers or goods, the wheel loading may vary within wide limits and the distribution of the total load between the various wheels may also vary so that it is difficult to provide a braking system which will provide braking approaching the optimum on different wheels under different conditions of loading.

The design of a braking system therefore is usually a compromise, and under some conditions one or more wheels of a vehicle may skid while the brakes on other wheels are not fully loaded. This is particularly the case with goods vehicles where the variation in the wheel loading between empty and laden conditions may be very substantial.

According to my invention fluid under pressure is supplied to an actuator or actuators for the brake or brakes on one or more wheels of a vehicle through a valve system incorporating a movable valve element adapted to be moved in one direction by fluid pressure acting on a member co-operating with an inclined plane of which the angle can be varied in accordance with the loading on the wheel or wheels, the valve element being moved in the other direction by the application to the valve element or to a part associated with it of fluid under another pressure which will normally be that applied to the actuator or actuators.

The variation in the angle of the inclined plane may be effected manually in accordance with the loading on the wheel or wheels, or it may be effected automatically, as for example by coupling it to the suspension of an axle of the vehicle.

Figure 1:
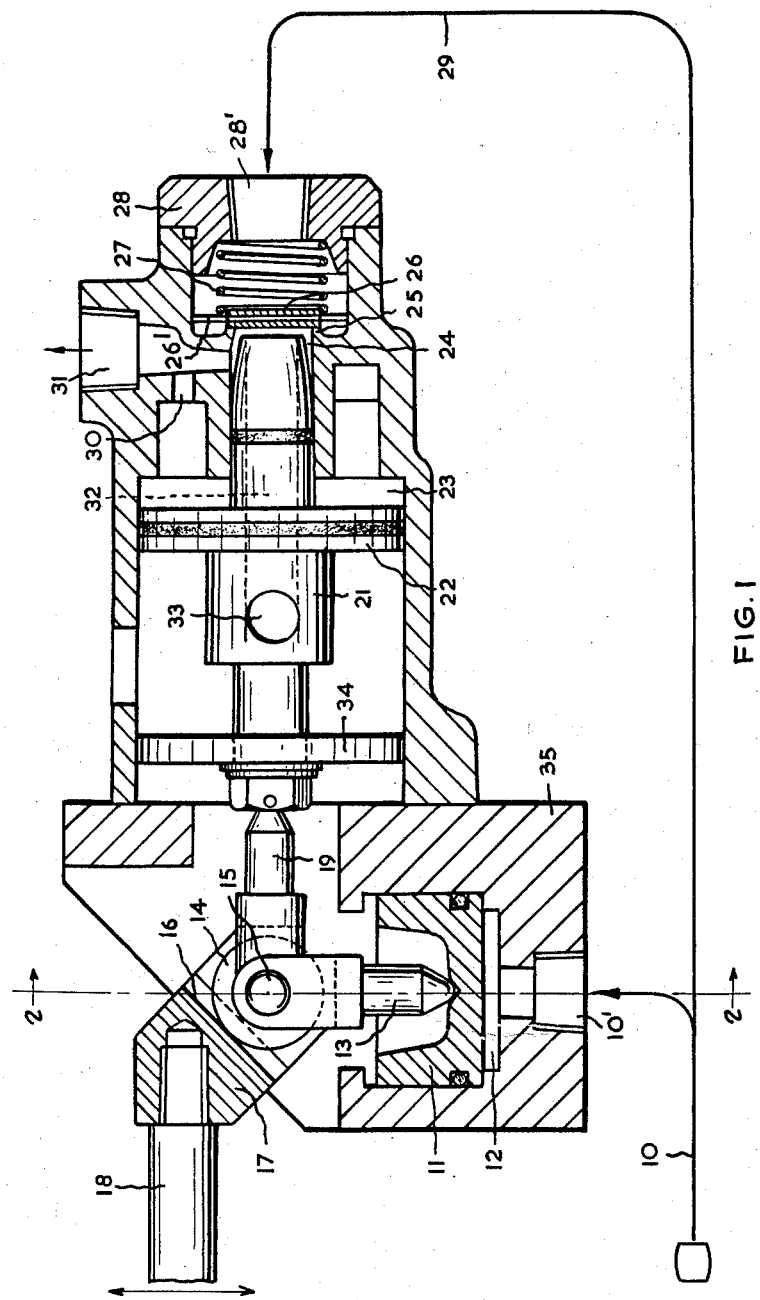
Figure 2:
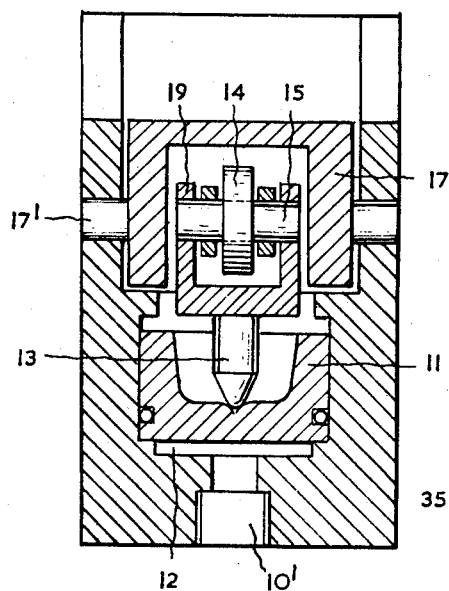

One embodiment of my invention as applied to a braking system for vehicles in which the brakes are actuated by compressed air is illustrated diagrammatically by way of example in the accompanying drawings wherein;

FIG. 1 is a longitudinal section of a control unit; and
FIG. 2 is a transverse section taken substantially on the line 2—2 of FIG. 1.

A pipe line 10 carrying air at a pressure which is controlled by a manually operated regulator is connected to a port 10′ in a block 35. The port leads into a cylinder 12 in the block in which works a piston 11. The free end of one limb 13 of a bell crank lever having its limbs at right angles to each other is in rocking engagement with the piston, and a roller 14 rotatable on a pin 15 mounted in the lever at the junction of the limbs bears on an inclined plane 16 in a member 17 having opposed aligned trunnions 17′ rotatably mounted in bearings in the block 35, the axis of the trunnions being parallel to the axis of the pin 15. An arm 18 is fixed in the member 17 for moving it angularly and the arm may be adjusted manually or automatically in accordance with the loading of the vehicle. In its mid position the inclined plane is at an angle of 45° to the limbs of the bell crank lever. The free end of the second limb 19 of the bell crank lever is in rocking engagement with one end of an aligned valve element 21 carrying a piston 22 working in a control cylinder 23 which is open at its rear end and of which the axis is at right angles to that of the cylinder 12. The forward end of the valve element 21 works in a bore 24 in alignment with the cylinder 23, and a seating 25 at the forward end of the bore is engaged by a disc valve 26 loaded by a light spring 27 located between the valve and a hollow plug 28 which is screwed into the outer end of a recess in the body on the outer side of the valve seating. The plug has an inlet port 28′ adapted to receive a connection for a pipe line 29 conveying air under the same pressure as the supply to the cylinder 12. The valve 26 is located in alignment with the seating 25 by spider arms 26′ which guide the valve slidably in the recess and past which air can flow when the valve is moved away from the seating.

The forward end of the valve element 21 is reduced in diameter and the bore 24 on the rear side of the valve seat 25 is in communication with the control cylinder 23 in front of the piston 22 by way of a passage 30 and with a port 31 adapted to be connected to an actuator or actuators for the brake or brakes to be controlled.

The valve element is drilled axially from its forward end with a bore 32 which intersects a radial port 33 leading into the open space behind the control piston and providing an exhaust passage for air from the actuator or actuators.

In the application of the brake, air at line pressure is supplied to the cylinder 12 and to the hollow plug 28. The pressure acting on the piston 11 in the cylinder 12 moves the piston axially and with it the bell crank lever. The roller 14 is forced against the inclined plane 16 along which it rolls so that the bell crank lever is moved to the right in the drawing and moves the valve element 21 axially to move the disc valve 26 away from the seating 25. This allows air to flow from the forward side of the seating into the port 31 leading to the brake actuator or actuators and into the control cylinder 23 on the forward side of the piston 22 where it acts on the piston in opposition to the force exerted on the valve element through the bell crank lever.

The area of the piston 22 is substantially greater than that of the piston 11 acting on the bell crank lever, and when the pressure in the control cylinder reaches a predetermined value the valve element 21 moves rearwardly and allows the valve 26 to close, thus isolating the control cylinder and the brake actuator or actuators from the line pressure.

When the line pressure is reduced the valve element 21 moves away from the valve and allows air from the actuator or actuators to pass to exhaust through the axial bore 32 and radial port 33 in the valve element.

Balance at the controlled ratio between the pressure of the air supplied and the pressure in the actuator or actuators is obtained when the valve 26 is closed and the forward end of the valve element 21 is in engagement with the valve 26 so that the exhaust passage is closed.

The effective leverage through which the piston 11 acts on the valve element 21 depends on the angle which the inclined plane 16 makes with the axis of the cylinder 12. Practical limits for this angle are between 30° and 60° and these give a range of leverages between approximately 1 to 2 and 2 to 1. If the area of the piston 22 is twice that of the piston 11, the pressure ratio is variable between approximately 1 to 1 and 4 to 1.

In a modification the bell crank lever may be replaced by two push rods which are pivotally connected together by the pin 15 on which the roller 14 is mounted, the ends of the push rods opposite to those connected together bearing one against the piston 11 in the first cylinder 12, and the other against the movable valve element 21. This construction tends to reduce the cross-binding effect on the piston and the valve element and is a more suitable arrangement when the travel of the roller on the inclined plane is such that its axis moves to some appreciable distance from the axis of either or both cylinders.

In the arrangement illustrated, binding of the valve element and control piston under any transverse loading applied by the bell crank lever is prevented by providing on the rear end of the valve element a steady disc or piston 34 working in the open rear end of the control cylinder.

In another modification the control piston may be replaced by a diaphragm.

In the application of my invention to a vehicle braking system, the brakes on the front wheels can be applied by actuators to which air is supplied at line pressure while the brakes on the rear wheels are applied by air at a pressure which is controlled by the means described above and which is automatically varied in accordance with the loading on the rear wheels by coupling the arm 18 of the angularly movable member 17 to the suspension for the rear axle so that the angle of the inclined plane is varied automatically with loading.

The pressure air which is supplied to the control unit may be taken from a reservoir maintained at a substantially constant pressure by an engine-driven pump, or the air may be supplied at a controlled pressure from another control unit, and two or more control units may be associated to provide air at different pressures to apportion the braking effort between the axles of a vehicle in accordance with the axle loading.

I claim:

1. Means for controlling the pressure of fluid applied to a fluid pressure brake actuator from a line supplying fluid at a predetermined pressure including a valve body and a valve element movable in said body, means for moving said valve element in one direction comprising a member exposed to the line pressure and disposed at an angle to said valve member, an angularly movable fulcrum including an inclined surface, means operatively connecting said member with said valve element and bearing on the inclined surface of the angularly movable fulcrum, and means for moving the valve element in the opposite direction comprising a part associated with the valve element and exposed to the controlled pressure supplied to the actuator.

2. Means as in claim 1 wherein said angularly movable member adapted to be coupled to a suspension for the axle of a vehicle whereby the angle of the inclined plane is varied automatically in accordance with the loading of the axle.

3. Means as in claim 1 wherein said valve element and member move in directions substantially at right angles to each other and wherein said operative connecting means includes a bell-crank lever having two limbs which are substantially at right angles to each other and respectively engaging said member and said valve element, and a roller mounted in the lever at the junction of the limbs and bearing on the inclined plane.

4. Means as in claim 1 wherein said valve element includes a fluid pressure responsive member exposed on one side to the pressure applied to the actuator and on the other side to atmosphere, a normally closed disc valve for connecting said actuator with said line pressure and urged by said line pressure towards its closed position, normally open exhaust valve means for connecting said actuator to atmosphere, means responsive to the movement of said valve element in one direction by line pressure admitted to said first named member for closing said exhaust valve means and thereafter opening said disc valve, the pressure in said actuator acting on said pressure responsive member to move said valve element in the opposite direction to close said disc valve and then open said exhaust valve upon a decrease in said line pressure.

5. Means for supplying fluid at a controlled pressure to a fluid pressure brake actuator from a line supplying fluid at a predetermined pressure comprising an axially movable valve element, a first cylinder of which the axis is substantially at right angles to that of the valve element, a piston working in the cylinder and exposed to the line pressure, a bell crank lever having two limbs of which one is in rocking engagement with the piston and the other is in rocking engagement with the valve element, a roller mounted in said lever at the junction of the limbs, an inclined plane on which the roller bears and of which the inclination is variable, a second cylinder concentric about the valve element, a piston carried by the valve element and working in said cylinder, a valve seating at one end of the cylinder, a disc valve cooperating with said seating and exposed on the side remote from the seating to the line pressure, a port in the said second cylinder between the valve seating and the piston, said port being adapted to be connected to the brake actuator, and an exhaust passage through the valve element by-passing the piston in the second cylinder, the piston in the first cylinder urging the valve element in one direction with a force dependent on the area of the piston and the inclination of the inclined plane to cause the valve element to engage the valve disc and move it away from its seating to allow fluid to pass to the actuator and to the second cylinder, and the piston carried by the valve element urging the valve element in the opposite direction with a force dependent on the pressure applied to the actuator to allow the disc valve to engage its seating and to allow fluid from the actuator to flow through the exhaust passage in the valve element when the valve element is out of engagement with the disc valve.

No references cited.